(12) United States Patent
Azegami et al.

(10) Patent No.: US 11,863,050 B2
(45) Date of Patent: Jan. 2, 2024

(54) ROTATING MACHINE WITH WIND GUIDE MEMBER

(71) Applicant: MEIDENSHA CORPORATION, Tokyo (JP)

(72) Inventors: Takuto Azegami, Tokyo (JP); Takayuki Onishi, Tokyo (JP); Keisuke Matsuo, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/910,440

(22) PCT Filed: Mar. 8, 2021

(86) PCT No.: PCT/JP2021/009068
§ 371 (c)(1),
(2) Date: Sep. 9, 2022

(87) PCT Pub. No.: WO2021/182416
PCT Pub. Date: Sep. 16, 2021

(65) Prior Publication Data
US 2023/0124571 A1    Apr. 20, 2023

(30) Foreign Application Priority Data

Mar. 11, 2020    (JP) .................................. 2020-041702

(51) Int. Cl.
*H02K 5/20* (2006.01)
*H02K 9/06* (2006.01)

(52) U.S. Cl.
CPC ............... *H02K 9/06* (2013.01); *H02K 5/207* (2021.01)

(58) Field of Classification Search
CPC ............ H02K 5/20; H02K 5/207; H02K 7/10; H02K 7/1004; H02K 7/1008; H02K 9/02; H02K 9/04; H02K 9/06
See application file for complete search history.

(56) References Cited

U.S. PATENT DOCUMENTS

| | | | | |
|---|---|---|---|---|
| 2,114,907 A | * | 4/1938 | Oesterlein | H02K 9/14 415/232 |
| 3,749,953 A | * | 7/1973 | Baumann | H02K 9/06 310/62 |
| 4,009,405 A | * | 2/1977 | Gleichman | H02K 9/06 310/58 |

FOREIGN PATENT DOCUMENTS

| | | |
|---|---|---|
| JP | 60-124267 U | 8/1985 |
| JP | 2000-041361 A | 2/2000 |
| JP | 2000324757 A * | 11/2000 |

(Continued)

OTHER PUBLICATIONS

Koyama, Machine Translation of JP2017109823, Jun. 2017 (Year: 2017).*

(Continued)

*Primary Examiner* — Eric Johnson
(74) *Attorney, Agent, or Firm* — Foley & Lardner LLP

(57) ABSTRACT

The present invention relates to a rotating machine and a hoist. An object of the present invention is to provide a rotating machine and a hoist with improved cooling performance. A motor (10) includes: a stator (11) and a rotor (12); a rib part (12*d*) that rotates in accordance with rotation of the rotor (12), and a wind guide member (16) that guides wind taken in from a ventilation inlet (15*aa*) by rotation of the rib part 12*d* to a ventilation outlet (15*ab*).

15 Claims, 13 Drawing Sheets

(56) References Cited

FOREIGN PATENT DOCUMENTS

| | | | | |
|---|---|---|---|---|
| JP | 2016-105668 A | 6/2016 | | |
| JP | 2017109823 A | * | 6/2017 | ............... H02K 5/20 |

OTHER PUBLICATIONS

Ito, Machine Translation of JP2000324757, Nov. 2000 (Year: 2000).*

* cited by examiner

ROTATING MACHINE WITH WIND GUIDE MEMBER

TECHNICAL FIELD

The present invention relates to rotating machines and hoists, and more particularly to a rotating machine of a self-ventilation type that cools a coil end by the wind generated by the rotation of a rotor, and a hoist of an elevator using the rotating machine of the self-ventilation type.

BACKGROUND ART

The hoist winds up a rope that connects a car and a balance weight in an elevator. A sheave for winding up the rope in the hoist is rotationally driven by a motor, which is an example of a rotating machine. The motor generates heat while driving, and leads to a possibility of decreasing efficiency or the like. Thus, cooling the motor is desired. It is conceivable that a blower facility for cooling the motor is separately provided. However, there is a problem that its provision upsizes the apparatus.

Hence, conventionally, an invention has been proposed in which blower blades rotated by a rotor of a motor are provided to avoid upsizing of an apparatus (see Patent Literature 1).

CITATION LIST

Patent Literature

Patent Literature 1: JP 2016-105668 A

SUMMARY OF INVENTION

Technical Problem

In Patent Literature 1, only a ventilation passage is provided, and there is no consideration for efficiently causing the wind to flow through the ventilation passage, and there is room for improvement in cooling performance.

An object of the present invention is to provide a rotating machine and a hoist with improved cooling performance.

Solution to Problem

A rotating machine according to one aspect of the present invention includes: a stator and a rotor; an outer frame member that covers the stator and the rotor from an outer side in a radial direction over an entire circumference in a circumferential direction; a cover member that has a surface on one side in an axial direction and covers an other side in the axial direction of the outer frame member; a blower blade that rotates in accordance with rotation of the rotor; and a wind guide member that guides wind taken in from a ventilation inlet by rotation of the blower blade to a ventilation outlet, wherein the ventilation inlet is a through hole that penetrates the cover member in the axial direction, the ventilation outlet is a through hole that penetrates the cover member in the axial direction, the wind guide member expands from a surface on one side in the axial direction of the cover member toward the blower blade between the ventilation inlet and the ventilation outlet, and a position in the radial direction of an end portion on the one side in the axial direction of the wind guide member is located at a position where a pressure received by the wind generated in the blower blade is an intermediate pressure between a high pressure and a low pressure, among positions in the radial direction of the blower blade.

The rotating machine according to the above one aspect may further include: an outer frame member that covers the stator and the rotor from an outer side in a radial direction over an entire circumference in a circumferential direction; and a cover member that covers the other side in an axial direction of the outer frame member, in which the ventilation inlet may be a through hole that penetrates the cover member in the axial direction, the ventilation outlet may be a through hole that penetrates the cover member in the axial direction, and the wind guide member may expand from a surface on one side in the axial direction of the cover member toward the blower blade between the ventilation inlet and the ventilation outlet.

In the rotating machine according to the above one aspect, a position in the radial direction of an end portion on the one side in the axial direction of the wind guide member may be located at a position where a pressure received by the wind generated in the blower blade is an intermediate pressure between a high pressure and a low pressure, among positions in the radial direction of the blower blade.

In the rotating machine according to the above one aspect, a position in the radial direction of the end portion on the one side in the axial direction of the wind guide member may be located at a position where a ratio of a distance in the radial direction from an end portion on an inner side in the radial direction of the blower blade to a distance in the radial direction between an end portion on an outer side in the radial direction and an end portion on an inner side in the radial direction of the blower blade falls within 55% to 65%.

In the rotating machine according to the above one aspect, a ratio of a closest distance between the wind guide member and the stator to a distance in the radial direction between an end portion on an outer side in the radial direction and an end portion on an inner side in the radial direction of the blower blade may fall within 20% to 30%.

In the rotating machine according to the above one aspect, an angle formed by the wind guide member and the cover member in a cross-section that passes through a central axis and that is parallel to the axial direction may fall within 35° to 45°.

In the rotating machine according to the above one aspect, the blower blade may expand from a spoke part that connects an outer side in the radial direction and an inner side in the radial direction of the rotor to the other side in the axial direction, and may also serve as a rib part that reinforces the rotor.

A hoist of an elevator may include: a sheave around which a rope for connecting a car and a balance weight is to be wound; and the rotating machine of the above one aspect for rotating the sheave.

Advantageous Effects of Invention

According to one aspect of the present invention, a rotating machine and a hoist with improved cooling performance can be provided.

DESCRIPTION OF EMBODIMENTS

Figure 1:
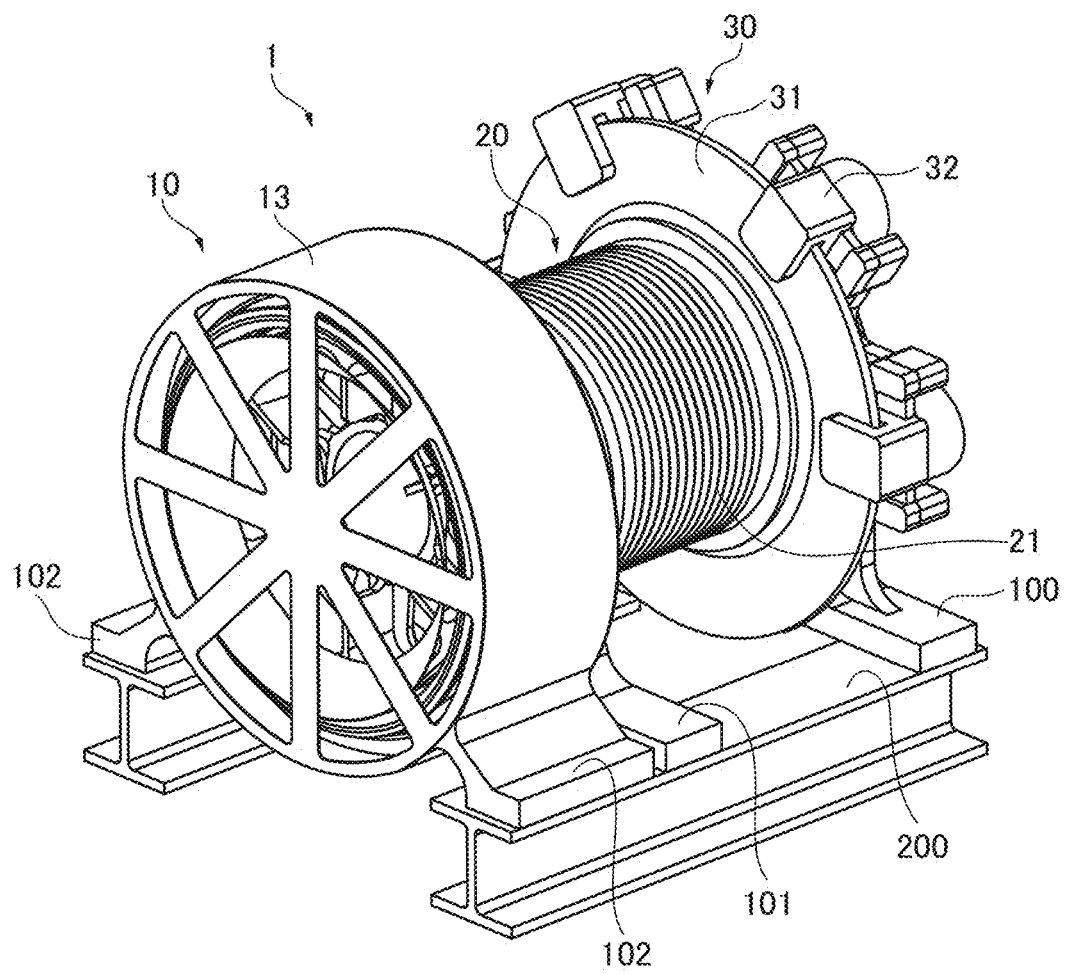
FIG. 1 is a perspective view of a hoist according to a first embodiment of the present invention.

Hereinafter, embodiments of the present invention will be described with reference to the drawings. In the embodiments, in order to facilitate understanding, structures and elements other than the main parts of the present invention will be described in a simplified or omitted manner. In addition, in the drawings, the same elements are denoted by the same reference numerals. Note that the shapes, dimensions, and the like of the respective elements illustrated in the drawings are schematically illustrated, and do not indicate actual shapes, dimensions, or the like.

Figure 3:
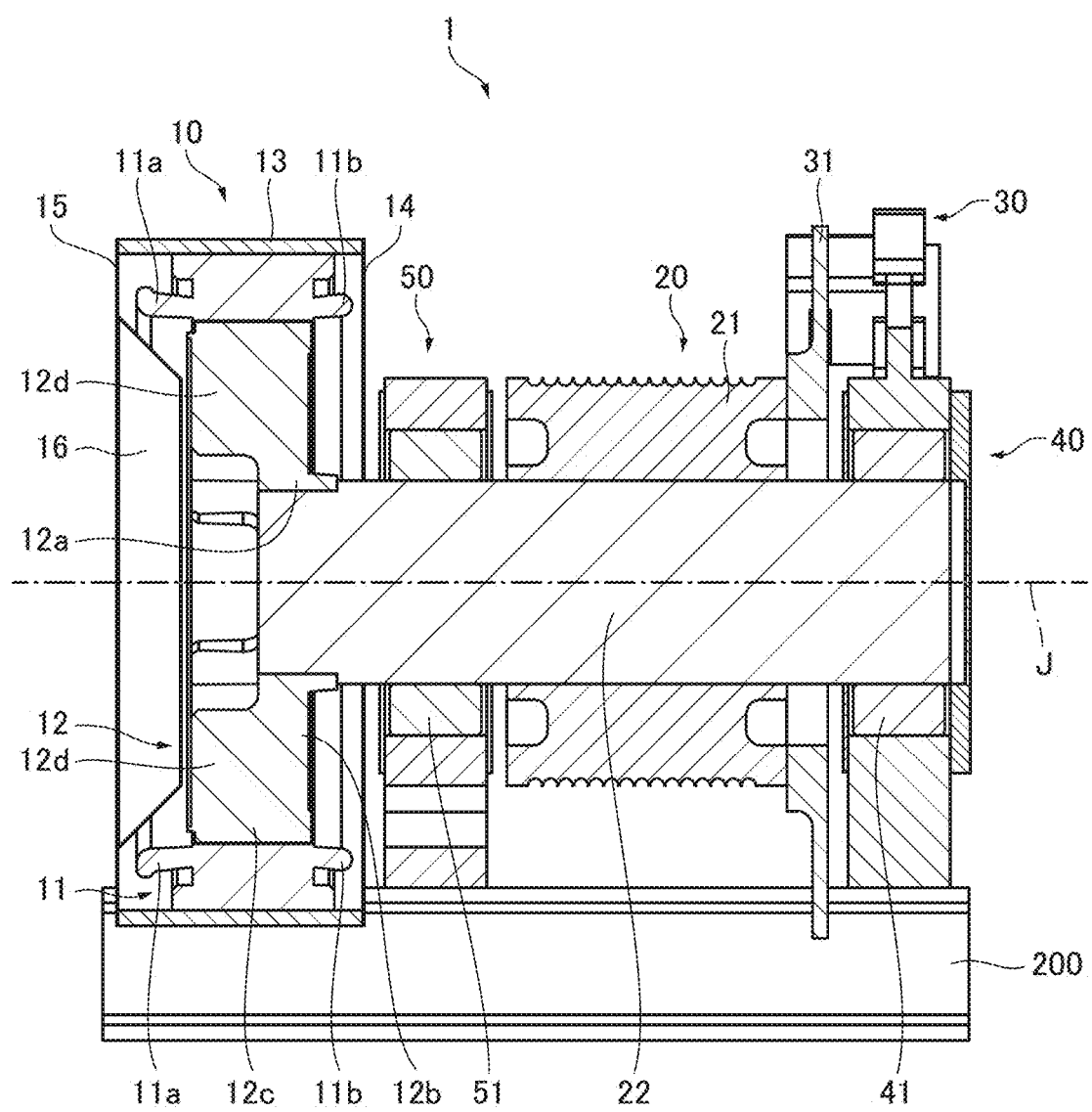
FIG. 3 is a side cross-sectional view illustrating the hoist 1 of FIG. 2 taken along a plane orthogonal to X axis and passing through a central axis J.

Note that in the following description, a direction in which a central axis J illustrated in FIG. 3 extends will be simply referred to as an "axial direction", a radial direction centered on the central axis J will be simply referred to as a "radial direction", and a circumferential direction centered on the central axis J will be simply referred to as a "circumferential direction". In addition, in the axial direction, the right side in FIG. 3 will be referred to as one side, and the left side in FIG. 3 will be referred to as the other side. Further, in the radial direction, a side close to the central axis J will be referred to as an inner side, and a side far from the central axis J will be referred to as an outer side.

Furthermore, in the drawings, an XYZ coordinate system will be illustrated as a three-dimensional orthogonal coordinate system, as needed. In the XYZ coordinate system, a Y-axis direction is a direction parallel to the central axis J, and is a left-right direction of the side cross-sectional view illustrated in FIG. 2. A Z-axis direction is a direction orthogonal to a Y-axis direction, and is an up-down direction in the side view illustrated in FIG. 2. An X-axis direction is a direction orthogonal to the Y-axis direction and the Z-axis direction. In any of the X-axis direction, the Y-axis direction, and the Z-axis direction, + side denotes a side on which an arrow illustrated in the drawing faces, and − side denotes an opposite side.

In addition, in the following description, extending or expanding in the axial direction includes not only a case of strictly extending or expanding in the axial direction (Y-axis direction) but also a case of extending or expanding in a direction inclined within a range smaller than 45° with respect to the axial direction. Further, in the following description, extending or expanding in the radial direction includes not only a case of strictly extending or expanding in the radial direction (Y-axis direction) but also a case of extending or expanding in a direction inclined within a range smaller than 45° with respect to the radial direction.

First Embodiment

Figure 2:
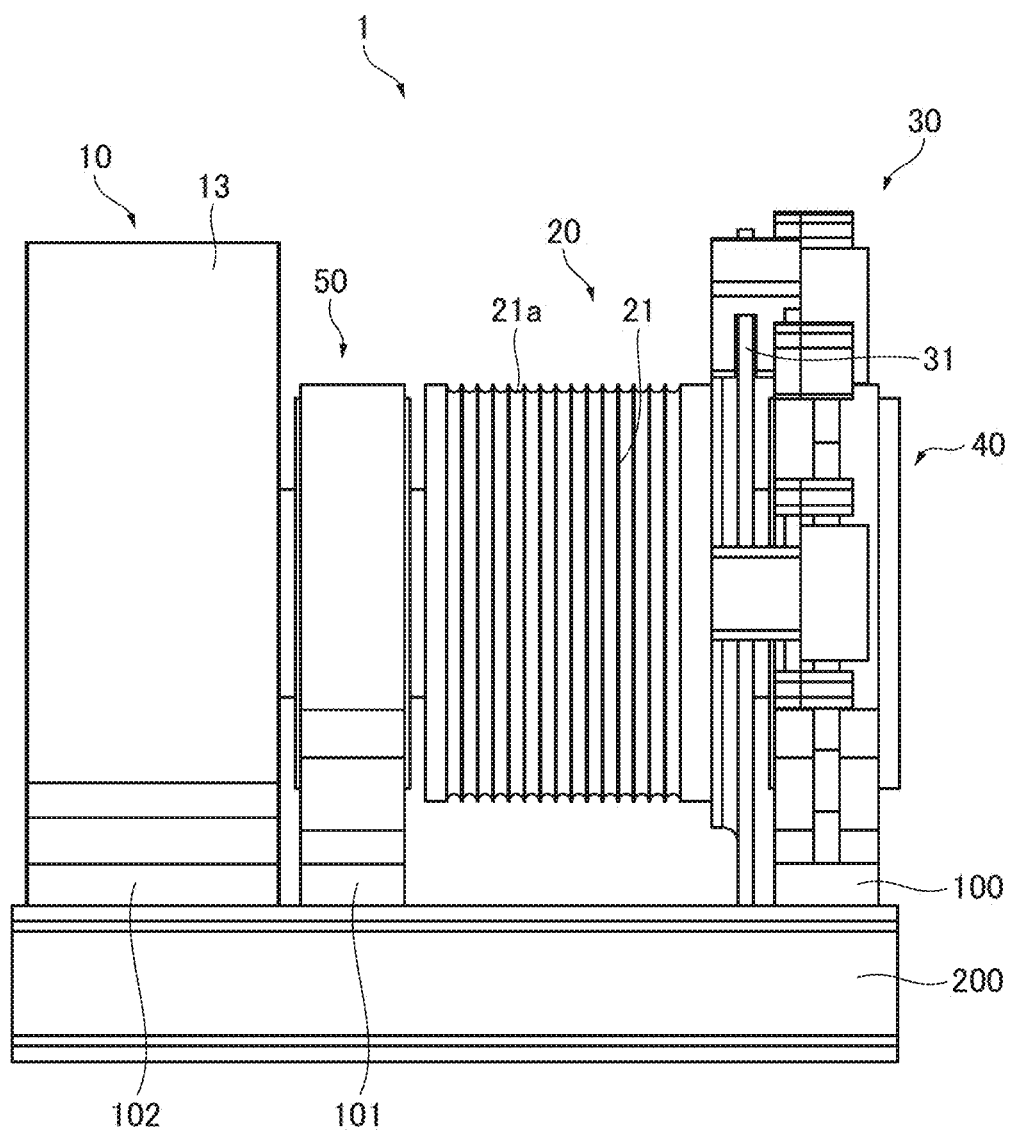
FIG. 2 is a side view of a hoist 1 of FIG. 1, when viewed from +X side.

FIG. 1 is a perspective view of a hoist according to a first embodiment of the present invention. The present embodiment is an example in which the present invention is applied to a hoist for winding up a rope that connects a car of an elevator and a balance weight. The present invention is also applicable to another machine other than the hoist of the elevator. The hoist 1 of FIG. 1 includes a sheave 20 around which a rope to be wound up is wound. FIG. 2 is a side view of the hoist 1 of FIG. 1, when viewed from +X side. FIG. 3 is a side cross-sectional view illustrating the hoist 1 of FIG. 2 taken along a plane orthogonal to X axis and passing through a central axis J.

In addition to the sheave 20, the hoist 1 includes a motor 10, which generates a driving force for causing the sheave 20 to rotate about the central axis J as a rotation axis, a shaft 22, which transfers the driving force that has been generated by the motor 10 to the sheave 20, a second bearing part 50 including a second bearing 51, which axially supports the shaft 22 to be rotatable on the other side in the axial direction with respect to the sheave 20, a first bearing part 40 including a first bearing 41, which axially supports the shaft 22 to be rotatable on one side in the axial direction with respect to the sheave 20, and a braking apparatus 30, which brakes the rotation of the sheave 20. As the first bearing 41 and the second bearing 51, for example, self-aligning roller bearings can be used. In FIG. 3, illustrations of details of the internal configurations of the first bearing 41 and the second bearing 51 are omitted. As the first bearing 41 and the second bearing 51, other known types of bearings may be used. Note that the second bearing 51 may be disposed on the other side in the axial direction with respect to the motor 10. The motor 10 is an example of the rotating machine.

The motor 10 includes a stator 11, a rotor 12, a casing 13, a cover member 14, a cover member 15, and a wind guide member 16. The motor 10 is disposed on the other side in the axial direction with respect to the sheave 20. The casing 13 is an example of an outer frame member. The casing 13 covers the stator 11 and the rotor 12 from an outer side in the radial direction over the entire circumference in the circumferential direction. The cover member 14 covers one side in the axial direction of the casing 13. The cover member 15 covers the other side in the axial direction of the casing 13. The wind guide member 16 is disposed on one side in the axial direction of the cover member 15.

The stator 11 includes coil ends 11a and 11b. The rotor 12 includes a hub part 12a, which has an annular shape and is disposed on an inner side in the radial direction, a rim part 12c, which has an annular shape and is disposed on an outer side in the radial direction, a spoke part 12b, which extends in a radial form from the hub part 12a and connects the hub part 12a and the rim part 12c, and a rib part 12d, which extends from the spoke part 12b to the other side in the axial direction and reinforces the rotor 12. The rim part 12c includes a magnet at a position facing the stator 11.

The casing 13 includes leg parts 102. The leg parts 102 are fixed to a base member 200 by, for example, bolts. The stator 11 is fixed to the casing 13. The rotor 12 is disposed with a gap from the stator 11. An end portion on the other side in the axial direction of the shaft 22 is fixed to the hub part 12a of the rotor 12 by press-fitting, for example. The motor 10 causes the rotor 12 to rotate about the central axis J as a rotation axis, according to current application. The shaft 22 rotates about the central axis J as a rotation axis in accordance with the rotation of the rotor 12.

The second bearing part 50 includes the second bearing 51. The second bearing part 50 includes leg parts 101. The leg parts 101 are fixed to the base member 200 by, for example, bolts.

The first bearing part 40 includes the first bearing 41. The first bearing part 40 includes leg parts 100. The leg parts 100 are fixed to the base member 200 by, for example, bolts.

The base member 200 is a member outside the hoist 1. The base member 200 is fixed to, for example, a floor, a side wall, or a ceiling of an elevator machine room.

The sheave 20 is fixed to the shaft 22 by press-fitting, for example. The sheave 20 includes a rope winding part 21, which has a cylindrical shape including a bore that penetrates in the axial direction. The rope winding part 21 includes a rope winding surface 21a on its outer peripheral surface. The hoist 1 winds up the rope by friction between the rope and the rope winding surface 21a.

The braking apparatus 30 includes a brake disc 31, and a brake clamper 32, which presses a brake pad against a braking surface of the brake disc 31 to apply braking by friction. The brake disc 31 is a circular plate-shaped member having a braking surface expanding in a direction orthogonal to the axial direction. The brake disc 31 is fixed to the sheave 20. The brake disc 31 rotates about the central axis J in accordance with the rotation of the sheave 20. The brake clamper 32 is fixed to the base member 200 via the first bearing part 40. The brake clamper 32 presses the brake pad against the braking surface of the brake disc 31 to apply braking on the rotation of the sheave 20.

Figure 4:
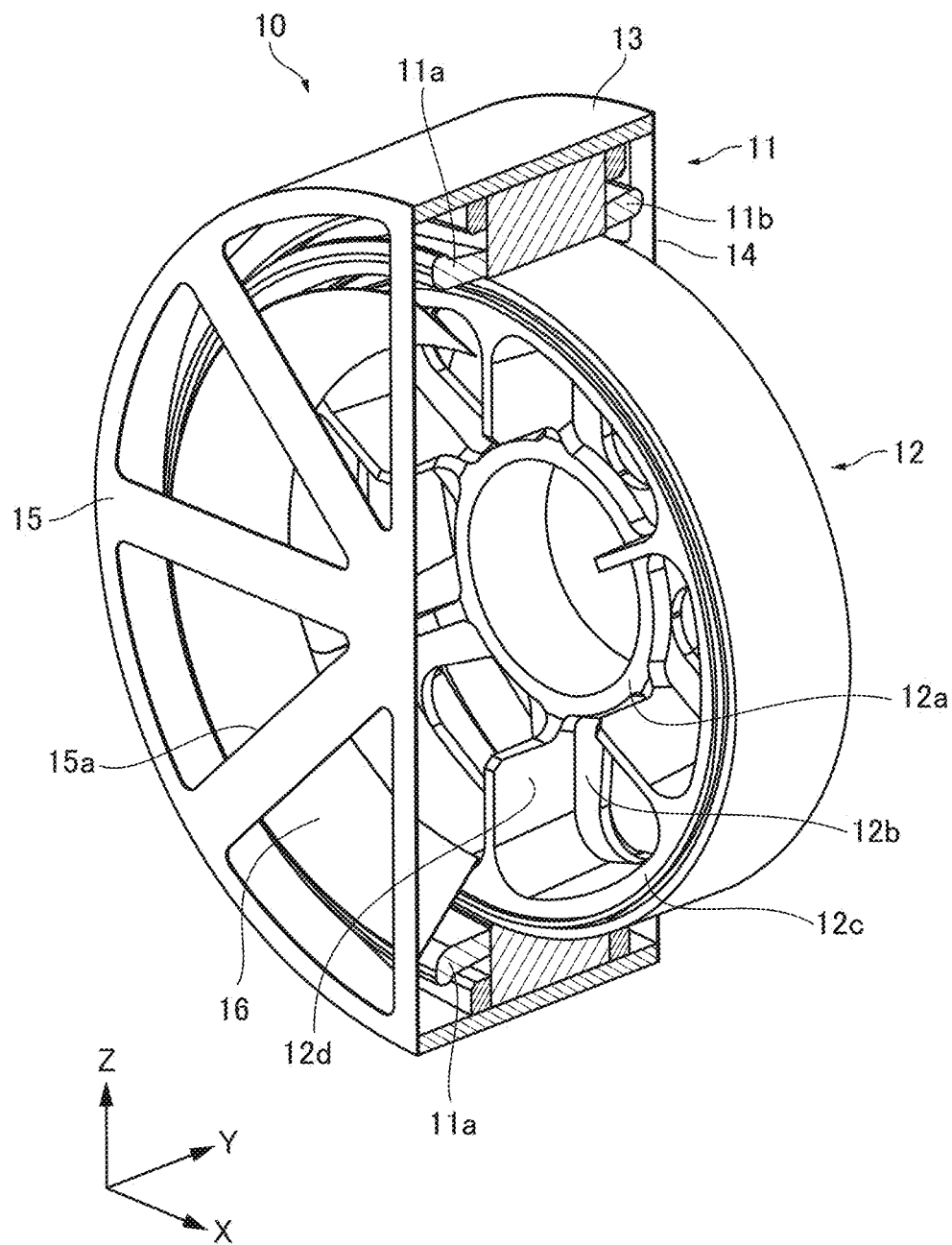
FIG. 4 is a perspective view illustrating a motor 10 of the hoist 1 of FIG. 1 in a partially cut-away manner.

FIG. 4 is a perspective view illustrating a motor 10 of the hoist 1 of FIG. 1 in a partially cut-away manner. In FIG. 4, except for the rotor 12, illustration is given by being cut along a plane orthogonal to X axis and passing through the central axis J. As illustrated in FIG. 4, in the present embodiment, the rotor 12 includes six spoke parts 12b disposed at equal intervals in the circumferential direction. The rotor 12 includes, for each of the six spoke parts 12b, a rib part 12d, which expands from the spoke part 12b to the other side in the axial direction between the hub part 12a and the rim part 12c. Accordingly, in the present embodiment, the rotor 12 has six rib parts 12d. The number of the spoke parts 12b and the number of rib parts 12d may be any number other than six. The number of the spoke parts 12b and the number of rib parts 12d do not have to be the same. The rotor 12 includes a bore that penetrates in the axial direction between a certain spoke part 12b and its adjacent spoke part 12b.

In the present embodiment, each of the six rib parts 12d includes surfaces parallel to the radial direction, each on a front side in a rotational direction and on a rear side in the rotational direction. The shapes of the surfaces parallel to the radial direction of the rib parts 12d are substantially quadrangular. The rib part 12d has a flat plate shape expanding in the radial direction and the axial direction. When the rotor 12 rotates about the central axis J, the six rib parts 12d also rotate about the central axis J. The rib parts 12d rotate, and thus blow air. The rib part 12d is an example of a blower blade. In the present embodiment, an end portion on the other side in the axial direction of the rib part 12d is located on one side in the axial direction with respect to an end portion on the other side in the axial direction of the coil end 11a. The coil end 11a is a coil end on the other side in the axial direction, among the coil ends of the stator 11.

The cover member 15 is located on the other side in the axial direction with respect to the rib parts 12d. The cover member 15 includes eight through holes 15a, which are disposed at equal intervals in the circumferential direction. The through holes 15a penetrate the cover member 15 in the axial direction. The wind guide member 16 is a cylindrical member, and its diameter gradually decreases, as approaching one side in the axial direction from the other side in the axial direction. The wind guide member 16 may be integrated with the cover member 15, or may be a separate member. In the present embodiment, an end portion on the other side in the axial direction of the wind guide member 16 is fixed to the surface on one side in the axial direction of the cover member 15 by, for example, bolts. The through hole 15a reaches a position on an inner side in the radial direction from a position on an outer side in the radial direction with respect to an end portion on the other side in the axial direction of the wind guide member 16. In the present embodiment, in the through hole 15a, a through hole on an inner side in the radial direction with respect to an end portion on the other side in the axial direction of the wind guide member 16 serves as a ventilation inlet 15aa (see FIG. 5). In the present embodiment, in the through hole 15a, a through hole on an outer side in the radial direction with respect to an end portion on the other side in the axial direction of the wind guide member 16 serves as a ventilation outlet 15ab (see FIG. 5). The wind guide member 16 expands from the surface on one side in the axial direction of the cover member 15 toward the rib part 12d between the ventilation inlet 15aa and the ventilation outlet 15ab.

Figure 5:
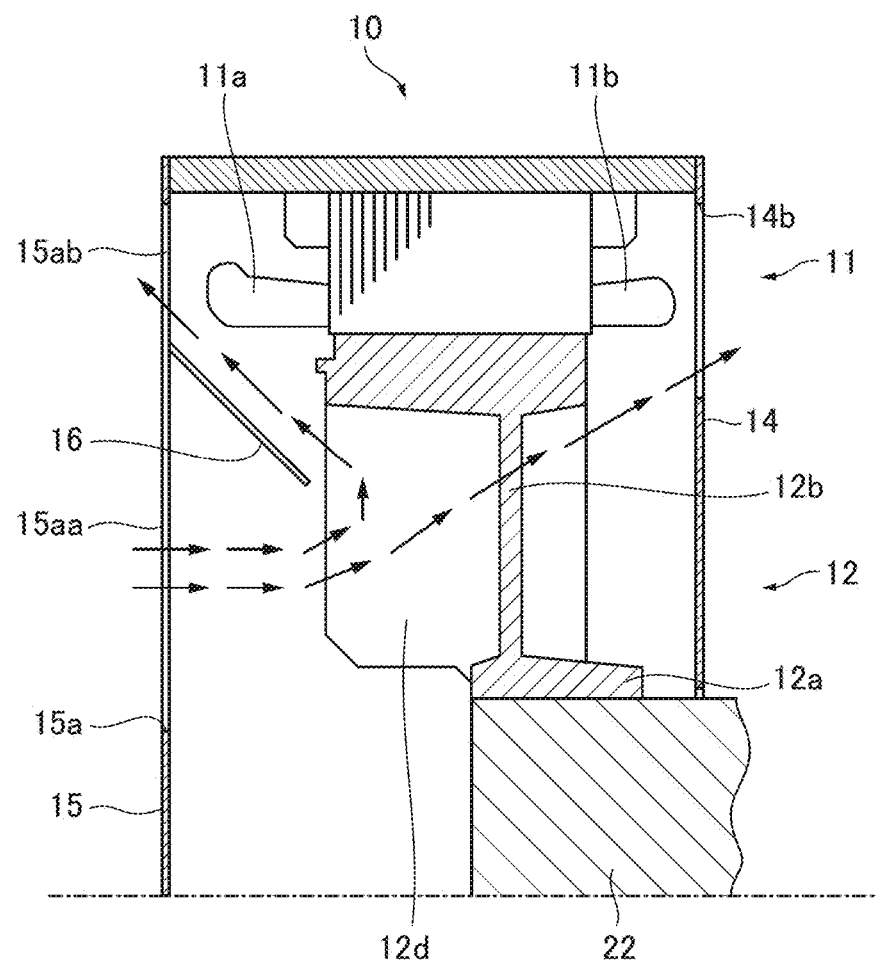
FIG. 5 is a cross-sectional view for describing the air flow caused by the rotation of the rib parts 12d.

FIG. 5 is a cross-sectional view for describing the air flow caused by the rotation of the rib parts 12d. The cover member 14 includes a through hole 14b at a position facing the coil end 11b in the axial direction. The through hole 14b penetrates the cover member 14 in the axial direction. The coil end 11b is one of the coil ends of the stator 11, on one side in the axial direction. As illustrated in FIG. 5, in the motor 10, a flow of the wind that flows from the ventilation inlet 15aa of the cover member 15 to the through hole 14b and a flow of the wind that flows from the ventilation inlet 15aa of the cover member 15 to the ventilation outlet 15ab of the cover member 15 are present. Unless the wind guide member 16 is provided, the air will stagnate between the ventilation inlet 15aa and the ventilation outlet 15ab of the cover member 15, and the cooling performance of the stator 11 will be degraded. According to the present embodiment, the wind can be guided from the ventilation inlet 15aa to the ventilation outlet 15ab of the cover member 15 by the wind guide member 16, the ventilation amount can be improved, and the cooling performance of the stator 11 can be improved.

Figure 6:
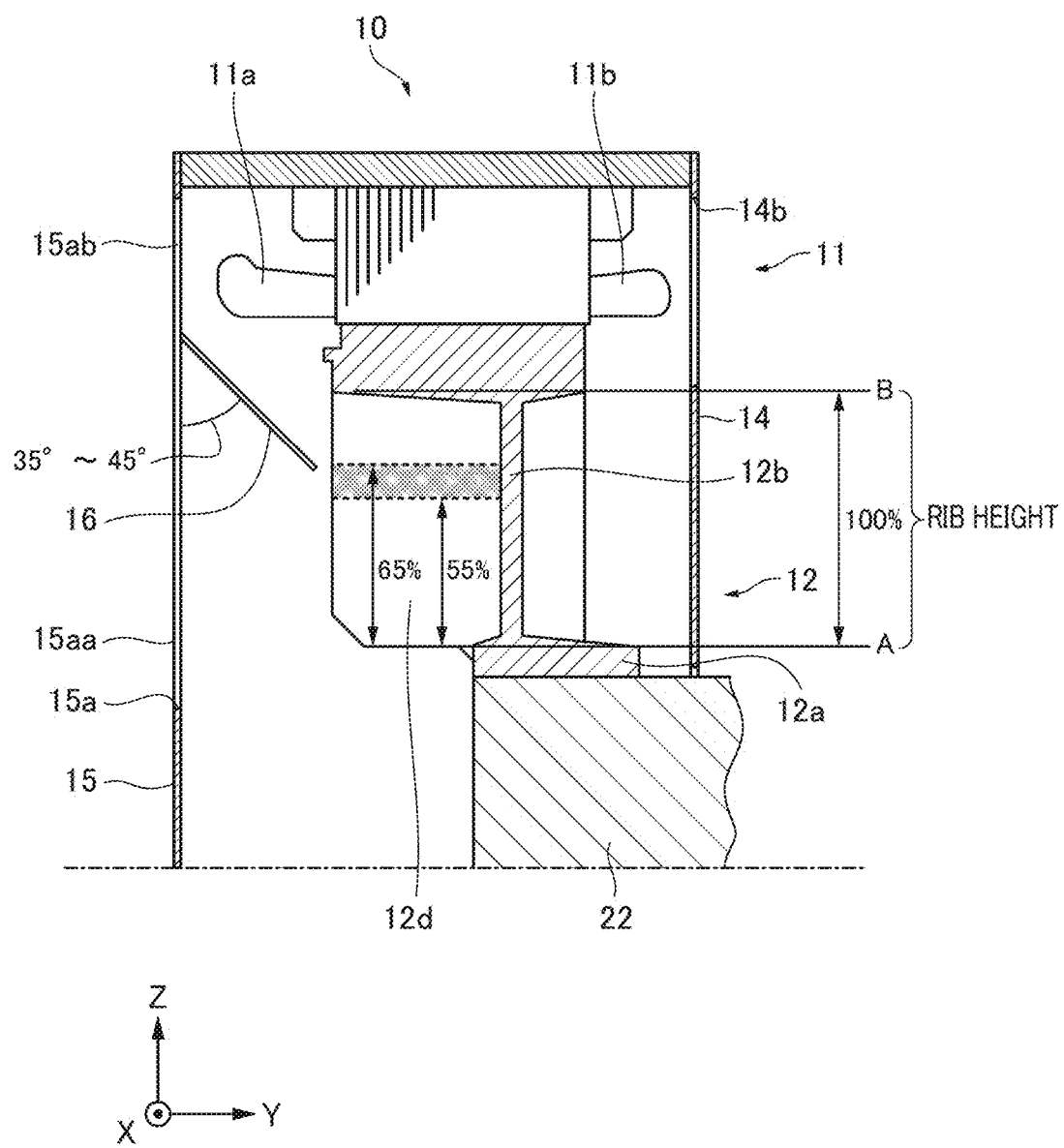
FIG. 6 is a view for describing an example of a position where a wind guide member 16 is disposed.

FIG. 6 is a view for describing an example of a position where the wind guide member 16 is disposed. The inventors have conducted numerical analyses on the ventilation amount of the wind that passes through the motor 10 to cool the stator 11, and have obtained the disposed position of the wind guide member 16 for increasing the ventilation amount. As results of numerical analyses, it has been found that the ventilation amount can be increased by disposing the wind guide member 16 as illustrated in FIG. 6.

Figure 8:
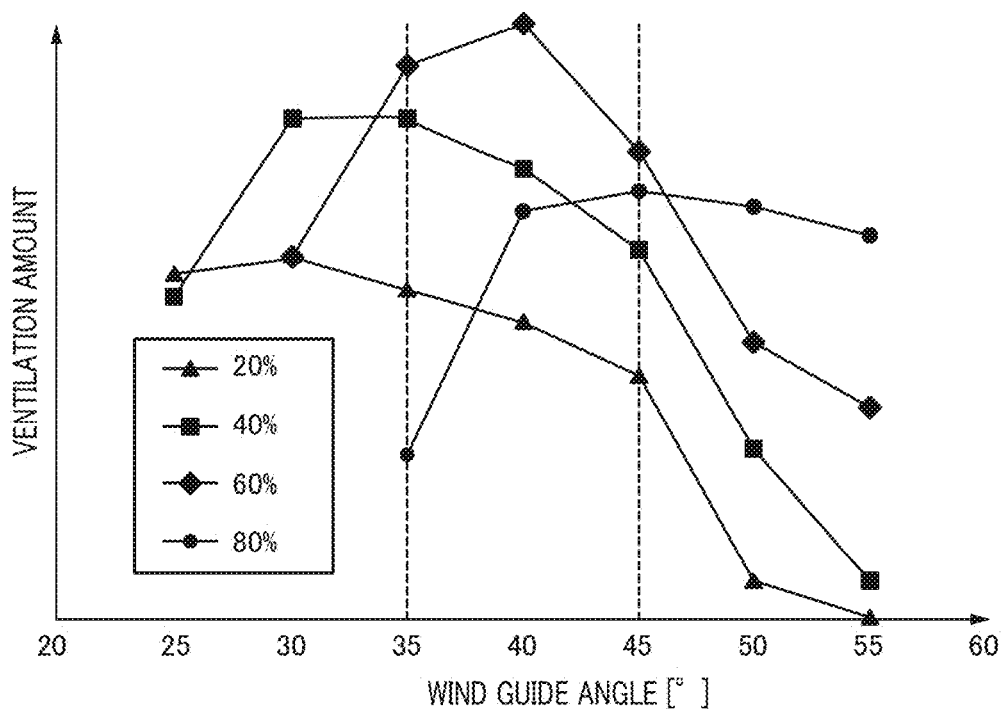
FIG. 8 is a view indicating results of ventilation amounts obtained by varying the wind guide angle.

As illustrated in FIG. 6, the position in the radial direction of an end portion of the wind guide member 16 on one side in the axial direction is desired to be located at a position where the ratio of the distance in the radial direction from an end portion (position A) on an inner side in the radial direction of the rib part 12d to the distance in the radial direction between an end portion (position B) on an outer side in the radial direction of the rib part 12d and the end portion (position A) on the inner side in the radial direction of the rib part 12d falls within 55% to 65%. Furthermore, an angle formed by the wind guide member 16 and the cover member 15 in a cross-section that passes through the central axis J and that is parallel to the axial direction (hereinafter, referred to as "wind guide angle") is desired to fall within 35° to 45°. The graph of FIG. 8 indicates results of the ventilation amounts obtained by varying the wind guide angle. As can be understood with reference to FIG. 8, the wind guide angle is desired to fall within 35° to 45°. In a case where the wind guide angle is larger than 45°, exhaust is hindered by the wind that flows in from the ventilation outlet 15ab, and thus the ventilation amount is reduced. In addition, in a case where the wind guide angle is smaller than 35°, the closest distance between the wind guide member 16 and the coil end 11a becomes shorter, the cross-sectional area of the flow passage is reduced, and the ventilation amount is reduced.

Figure 7:
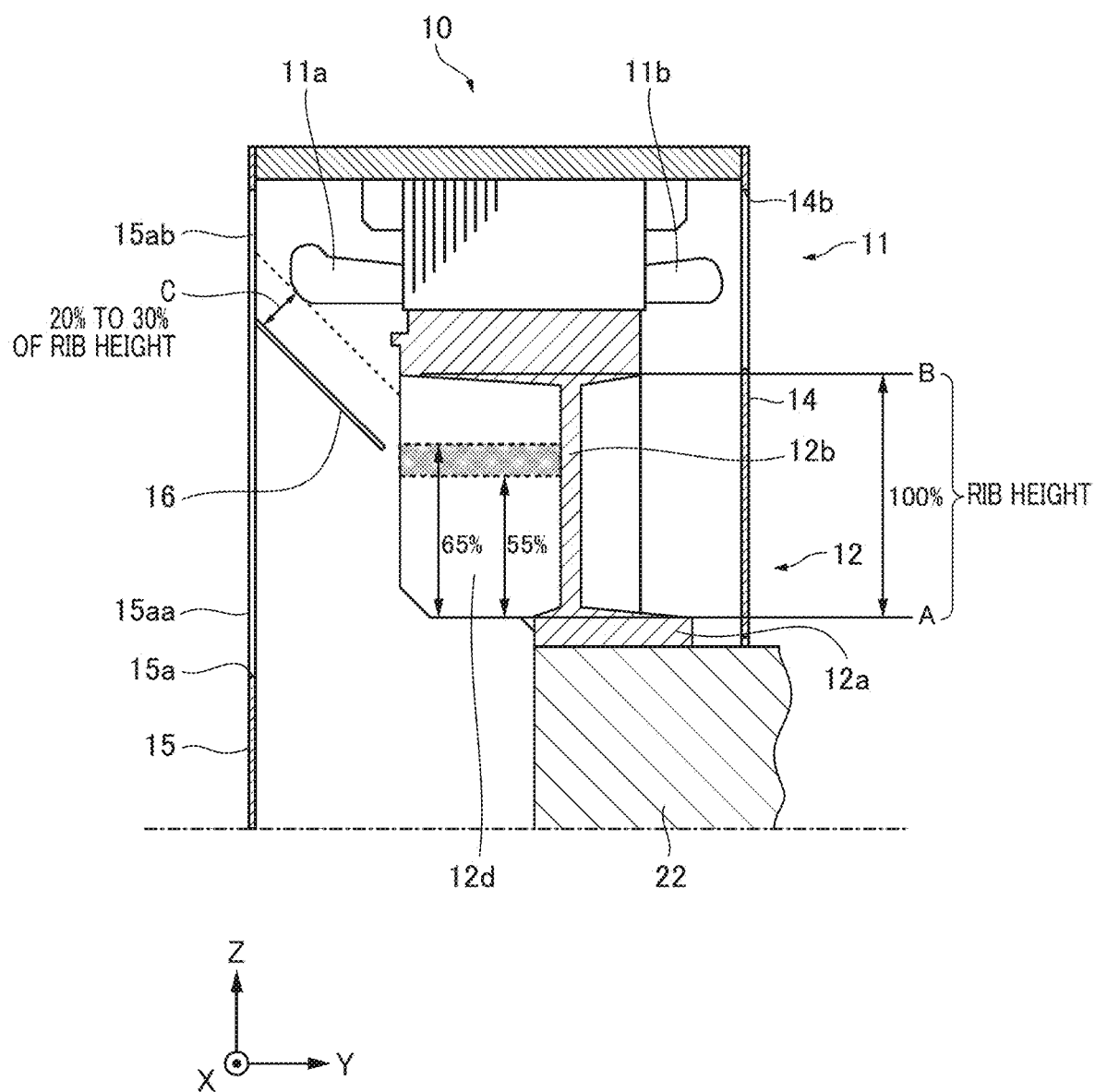
FIG. 7 is a view for describing an example of the position where the wind guide member 16 is disposed.

FIG. 7 is a view for describing an example of a position where the wind guide member 16 is disposed. FIG. 7 is obtained by numerical analyses similarly to FIG. 6. As illustrated in FIG. 7, the position in the radial direction of the end portion of the wind guide member 16 on one side in the axial direction is desired to be located at a position where the ratio of the distance in the radial direction from the end portion (position A) on an inner side in the radial direction of the rib part 12d to the distance in the radial direction between the end portion (position B) on an outer side in the radial direction of the rib part 12d and the end portion (position A) on the inner side in the radial direction of the rib part 12d falls within 55% to 65%. Furthermore, the ratio of the closest distance between the wind guide member 16 and the stator 11 (the closest distance between the wind guide member 16 and the coil end 11a in FIG. 7) to the distance in the radial direction between the end portion (position A) on an outer side in the radial direction of the rib part 12d and the end portion (position B) on an inner side in the radial direction of the rib part 12d is desired to fall within 20% to 30%. Even in a case where the radius of the air gap between the rotor 12 and the stator 11 (the distance from the central axis J to the air gap) is changed, the cooling performance can be improved by setting the ratio of the closest distance between the wind guide member 16 and the coil end 11a as illustrated in FIG. 7 to dispose the wind guide member 16.

Figure 9:
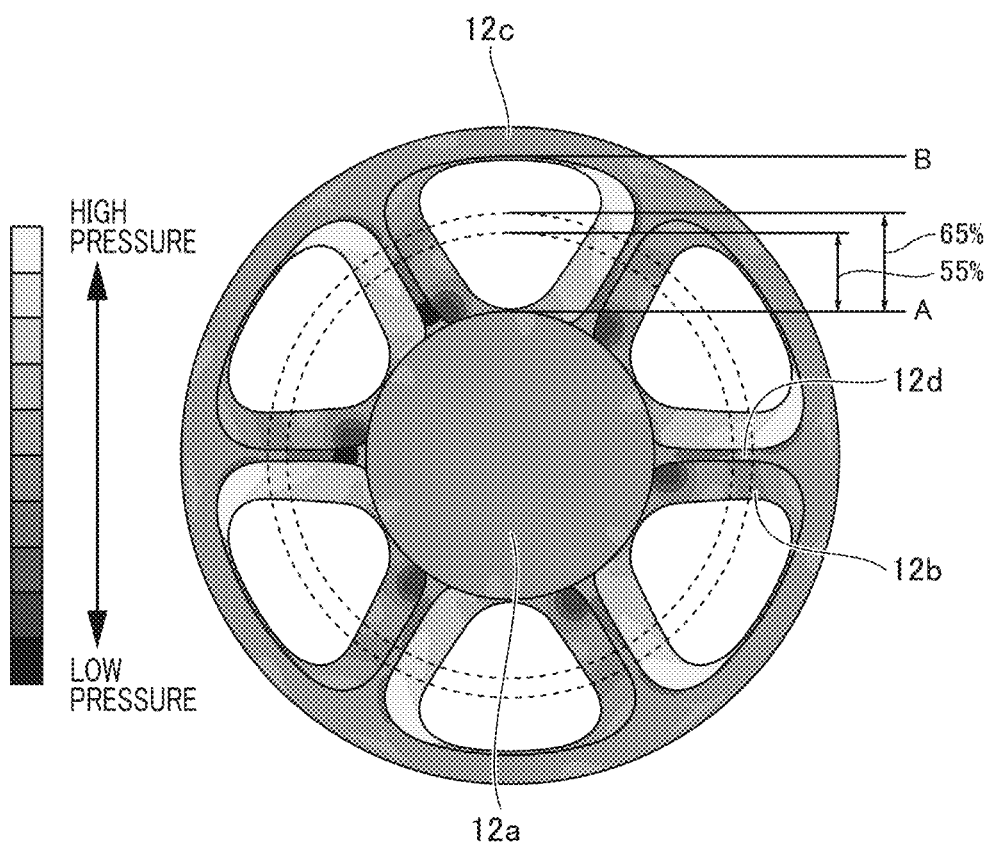
FIG. 9 is a view indicating results of numerical analyses of the wind pressure received by the surface orthogonal to the axial direction of a rotor 12.

FIG. 9 is a view indicating results of numerical analyses of the wind pressure received by the surface orthogonal to the axial direction of the rotor 12. In FIG. 9, illustration of the shaft 22 is omitted. FIG. 9 indicates that the darker the color, the lower the pressure. The position in the radial direction of the end portion of the wind guide member 16 on one side in the axial direction is located at the position where the pressure received by the wind generated in the rib part 12d is an intermediate pressure between a high pressure and a low pressure, among the positions in the radial direction of the rib part 12d. This is suitable for partitioning into the ventilation inlet 15aa and the ventilation outlet 15ab by use of the wind guide member 16. This is because the intake air and the exhaust air can be separated by partitioning between the high pressure and the low pressure. Therefore, the position in the radial direction of the end portion of the wind guide member 16 on one side in the axial direction is desired to be located at a position where the pressure received by the wind generated in the rib part 12d is an intermediate pressure between the high pressure and the low pressure, among positions in the radial direction of the rib part 12d. The position at the intermediate pressure between the high pressure and the low pressure corresponds to a position where the ratio of the distance in the radial direction from the end portion (position A) on an inner side in the radial direction of the rib part 12d to the distance in the radial direction between the end portion (position B) on an outer side in the radial direction and the end portion (position A) on an inner side in the radial direction of the rib part 12d falls within 55% to 65%.

Figure 10:
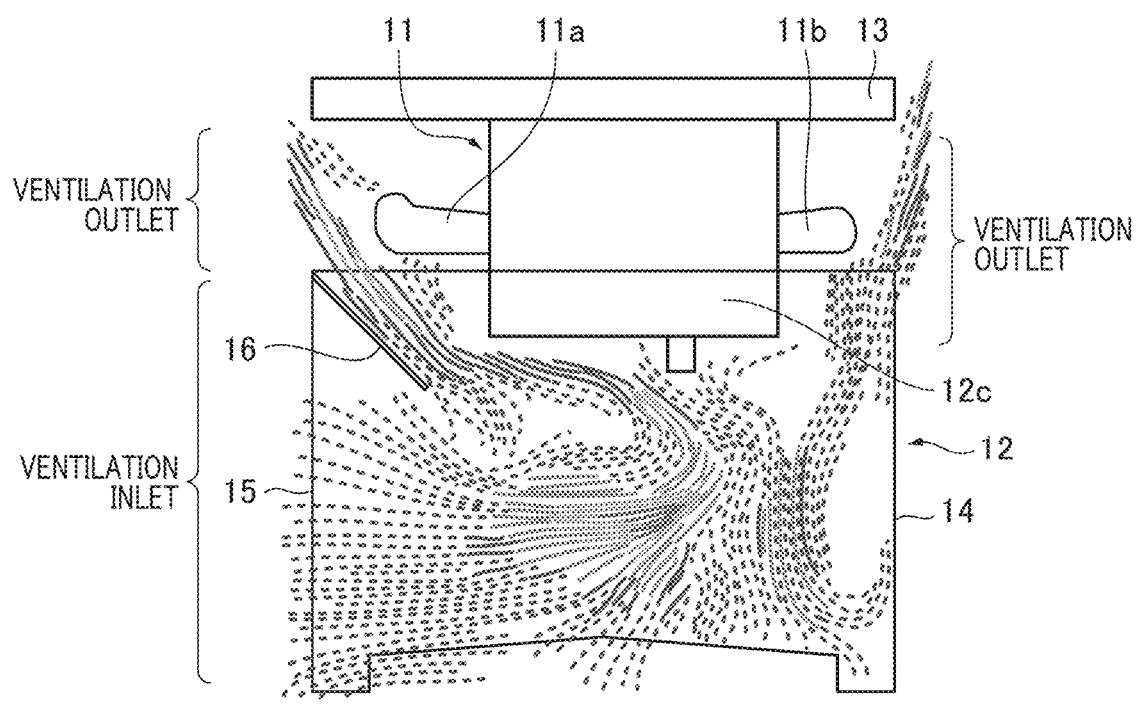
FIG. 10 is a view indicating results of numerical analyses in the example illustrated in FIG. 6, and illustrates flows of the wind.

FIG. 10 is a view indicating results of numerical analyses in the example illustrated in FIG. 6, and illustrates flows of the wind. The provision of the wind guide member 16 separates the intake air from the exhaust air with the wind guide member 16 as a boundary at both the ventilation inlet 15aa and the ventilation outlet 15ab, and thus achieves smooth ventilation.

Figure 11:
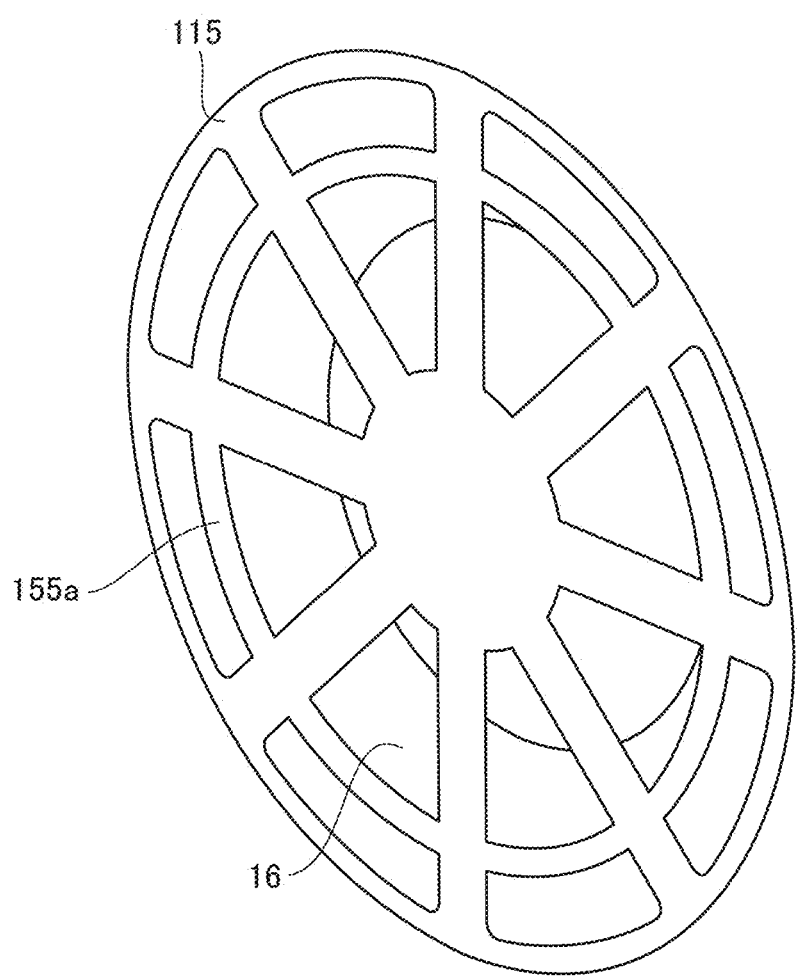
FIG. 11 is a perspective view illustrating an example of another cover member different from a cover member 15 illustrated in FIG. 4.

FIG. 11 is a perspective view illustrating an example of another cover member different from the cover member 15 illustrated in FIG. 4. A cover member 115 illustrated in FIG. 11 covers the other side in the axial direction of the casing 13. The wind guide member 16 is disposed on one side in the axial direction of the cover member 115. The cover member 115 includes a band part 155a at a contact portion with the wind guide member 16. The present invention is also applicable to a case where the cover member 115 is used. However, the ventilation inlet and the ventilation outlet are made smaller by the presence of the band part 155a, and air intake and air exhaust lack smoothness in some cases.

Figure 12:
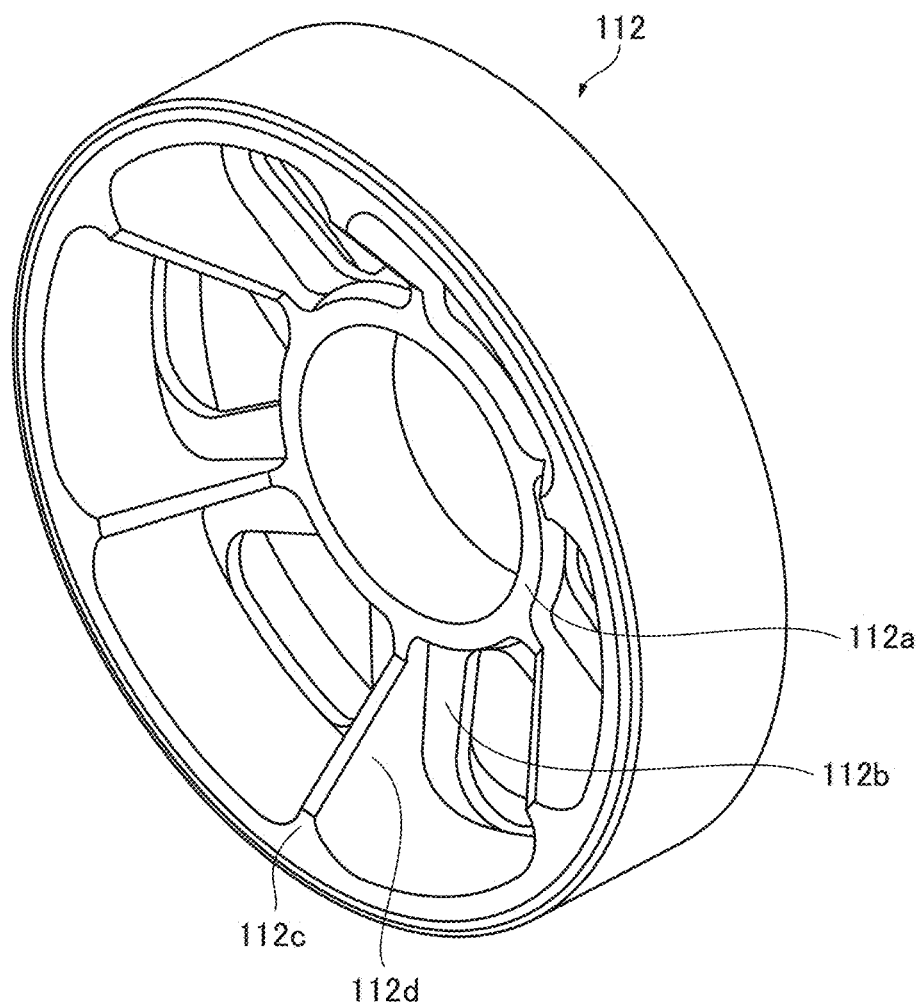
FIG. 12 is a perspective view illustrating an example of another rotor different from the rotor 12 illustrated in FIG. 4.
Figure 13:
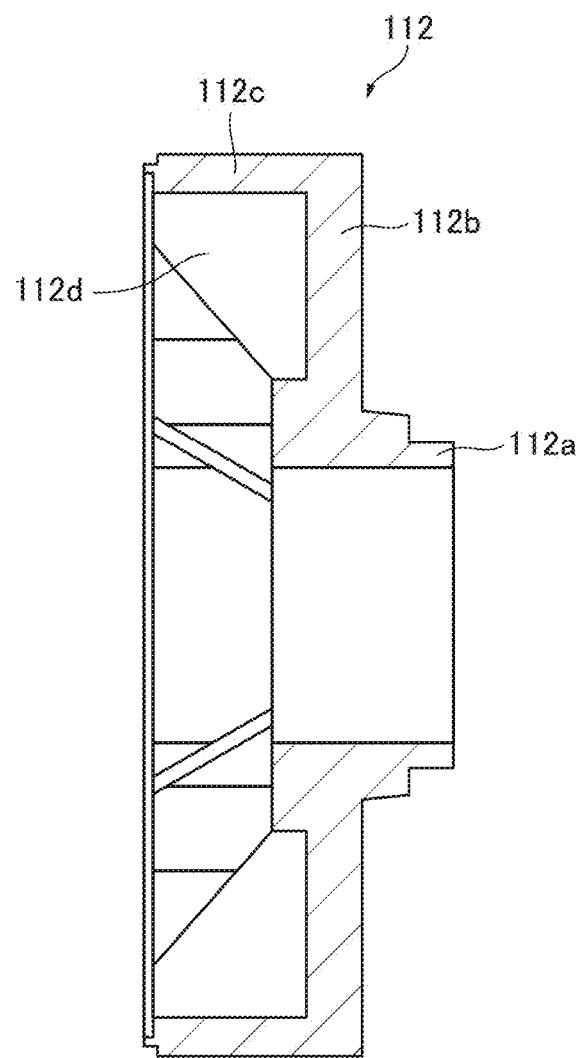
FIG. 13 is a side cross-sectional view of a rotor 112 of FIG. 12.

FIG. 12 is a perspective view illustrating an example of another rotor different from the rotor 12 illustrated in FIG. 4. The rotor 112 illustrated in FIG. 12 includes a hub part 112a, which has an annular shape and is disposed on an inner side in the radial direction, a rim part 112c, which has an annular shape and is disposed on an outer side in the radial direction, a spoke part 112b, which extends in a radial form from the hub part 112a and connects the hub part 112a and the rim part 112c, and a rib part 112d, which expands from the spoke part 112b to the other side in the axial direction and reinforces the rotor 112. FIG. 13 is a side cross-sectional view of the rotor 112 of FIG. 12.

The rib part 112d of the rotor 112 in FIG. 12 is different in shape from the rib part 12d of the rotor 12 in FIG. 4. Other points of the rotor 112 are the same as those of the rotor 12. The rib part 112d has a substantially triangular shape of a surface parallel to the radial direction. The rib part 112d has a flat plate shape expanding in the radial direction and the axial direction. When the rotor 112 rotates about the central axis J, the rib part 112d also rotates about the central axis J. The rib parts 112d rotate, and thus blow air. The rib part 112d is an example of a blower blade.

In the above embodiments, the description has been made with regard to the configuration example in which the present invention is applied to the hoist of the elevator. However, the present invention is not limited to this. The present invention is applicable to hoists for any purpose, as long as the hoist winds up a rope. In addition, the present invention is also applicable to any motors, as long as the motor causes the blower blades to rotate in accordance with the rotation of the rotor. The present invention is applicable to both an inner rotor type motor and an outer rotor type motor.

The present invention is not limited to the above embodiments, and various improvements and design changes may be made without departing from the gist of the present invention. In addition, the embodiments disclosed herein are to be considered in all respects as illustrative and non-limiting ones. The scope of the present invention is indicated not by the above description but by the scope of claims, and it is intended that meanings equivalent to the claims and all modifications within the scope are included.

The present application claims priority based on Japanese Patent Application No. 2020-041702 filed on Mar. 11, 2020, the entire contents of which are incorporated herein by reference.

REFERENCE SIGNS LIST

1 Hoist
10 Motor
16 Wind guide member
20 Sheave
30 Braking apparatus
40 First bearing part
50 Second bearing part
22 Shaft

The invention claimed is:

1. A rotating machine comprising: a stator and a rotor;
an outer frame member that covers the stator and the rotor from an outer side in a radial direction over an entire circumference in a circumferential direction;
a cover member that has a surface on one side in an axial direction and covers an other side in the axial direction of the outer frame member;
a blower blade that rotates in accordance with rotation of the rotor; and
a wind guide member that guides wind taken in from a ventilation inlet by rotation of the blower blade to a ventilation outlet, wherein
the ventilation inlet is a through hole that penetrates the cover member in the axial direction,
the ventilation outlet is a through hole that penetrates the cover member in the axial direction,
the wind guide member expands from the surface on one side in the axial direction of the cover member toward the blower blade between the ventilation inlet and the ventilation outlet, and
a ratio of a closest distance between the wind guide member and the stator to a distance in the radial direction between an end portion on an outer side in the radial direction and an end portion on an inner side in the radial direction of the blower blade falls within 20% to 30%.

2. The rotating machine according to claim 1, wherein the blower blade expands from a spoke part that connects an outer side in the radial direction and an inner side in the radial direction of the rotor to the other side in the axial direction, and also serves as a rib part that reinforces the rotor.

3. A hoist of an elevator, the hoist comprising:
a sheave around which a rope for connecting a car and a balance weight is to be wound; and
the rotating machine of claim 1 for rotating the sheave.

4. The rotating machine according to claim 1, wherein a position in the radial direction of an end portion on the one side in the axial direction of the wind guide member is located at a position where a pressure received by the wind generated in the blower blade is an intermediate pressure between a first pressure and a second pressure lower than the first pressure, among positions in the radial direction of the blower blade.

5. A rotating machine according to claim 1, wherein comprising: a stator and a rotor;
an outer frame member that covers the stator and the rotor from an outer side in a radial direction over an entire circumference in a circumferential direction;
a cover member that has a surface on one side in an axial direction and covers an other side in the axial direction of the outer frame member;
a blower blade that rotates in accordance with rotation of the rotor; and
a wind guide member that guides wind taken in from a ventilation inlet by rotation of the blower blade to a ventilation outlet, wherein
the ventilation inlet is a through hole that penetrates the cover member in the axial direction,
the ventilation outlet is a through hole that penetrates the cover member in the axial direction,
the wind guide member expands from the surface on one side in the axial direction of the cover member toward the blower blade between the ventilation inlet and the ventilation outlet, and
a position in the radial direction of the end portion on the one side in the axial direction of the wind guide member is located at a position where a ratio of a distance in the radial direction from an end portion on an inner side in the radial direction of the blower blade to a distance in the radial direction between an end portion on an outer side in the radial direction and the end portion on the inner side in the radial direction of the blower blade falls within 55% to 65%.

6. The rotating machine according to claim 5, wherein the position in the radial direction of the end portion on the one side in the axial direction of the wind guide member is located at a position where a pressure received by the wind generated in the blower blade is an intermediate pressure between a first pressure and a second pressure lower than the first pressure, among positions in the radial direction of the blower blade.

7. The rotating machine according to claim 4, wherein a ratio of a closest distance between the wind guide member and the stator to a distance in the radial direction between the end portion on the outer side in the radial direction and the end portion on the inner side in the radial direction of the blower blade falls within 20% to 30%.

8. The rotating machine according to claim 5, wherein
an angle formed by the wind guide member and the cover member in a cross-section that passes through a central axis and that is parallel to the axial direction falls within 35° to 45°.

9. The rotating machine according to claim 5, wherein
the blower blade expands from a spoke part that connects an outer side in the radial direction and an inner side in the radial direction of the rotor to the other side in the axial direction, and also serves as a rib part that reinforces the rotor.

10. A hoist of an elevator, the hoist comprising:
a sheave around which a rope for connecting a car and a balance weight is to be wound; and
the rotating machine of claim 4 for rotating the sheave.

11. A rotating machine according to claim 1, wherein comprising: a stator and a rotor;
an outer frame member that covers the stator and the rotor from an outer side in a radial direction over an entire circumference in a circumferential direction;

a cover member that has a surface on one side in an axial direction and covers an other side in the axial direction of the outer frame member;
a blower blade that rotates in accordance with rotation of the rotor; and
a wind guide member that guides wind taken in from a ventilation inlet by rotation of the blower blade to a ventilation outlet, wherein
the ventilation inlet is a through hole that penetrates the cover member in the axial direction,
the ventilation outlet is a through hole that penetrates the cover member in the axial direction,
the wind guide member expands from the surface on one side in the axial direction of the cover member toward the blower blade between the ventilation inlet and the ventilation outlet, and
an angle formed by the wind guide member and the cover member in a cross-section that passes through a central axis and that is parallel to the axial direction falls within 350 to 45°.

12. The rotating machine according to claim 11, wherein a position in the radial direction of an end portion on the one side in the axial direction of the wind guide member is located at a position where a pressure received by the wind generated in the blower blade is an intermediate pressure between a first pressure and a second pressure lower than the first pressure, among positions in the radial direction of the blower blade.

13. The rotating machine according to claim 11, wherein a ratio of a closest distance between the wind guide member and the stator to a distance in the radial direction between an end portion on an outer side in the radial direction and an end portion on an inner side in the radial direction of the blower blade falls within 20% to 30%.

14. The rotating machine according to claim 11, wherein the blower blade expands from a spoke part that connects an outer side in the radial direction and an inner side in the radial direction of the rotor to the other side in the axial direction, and also serves as a rib part that reinforces the rotor.

15. A hoist of an elevator, the hoist comprising:
a sheave around which a rope for connecting a car and a balance weight is to be wound; and
the rotating machine of claim 6 for rotating the sheave.

* * * * *